United States Patent [19]
Yamazaki et al.

[11] Patent Number: 5,515,349
[45] Date of Patent: May 7, 1996

[54] TRACK SEEK METHOD AND DEVICE FOR USE WITH AN OPTICAL INFORMATION RECORDING AND REPRODUCING APPARATUS

[75] Inventors: Koichi Yamazaki, Sakado; Kazuo Noda, Yokohama; Kenzou Yoshihara, Kounosu, all of Japan

[73] Assignee: Nippon Conlux Co., Ltd., Japan

[21] Appl. No.: 346,403

[22] Filed: Nov. 29, 1994

[30] Foreign Application Priority Data

Dec. 10, 1993 [JP] Japan .................................. 5-340921

[51] Int. Cl.$^6$ ............................................................ G11B 7/00
[52] U.S. Cl. .................. 369/44.280; 369/32; 369/54; 369/58
[58] Field of Search ............................. 369/44.28, 44.29, 369/44.32, 44.34, 32, 41, 43, 44.25, 54.58; 360/77.03, 78.05, 78.08; 235/454, 456, 475, 470

[56] References Cited

U.S. PATENT DOCUMENTS

| | | | |
|---|---|---|---|
| 4,745,587 | 5/1988 | Maeda et al. | 369/32 |
| 4,866,687 | 9/1989 | Kasai et al. | 369/32 |
| 5,307,333 | 4/1994 | Ikeda et al. | 369/44.28 |

FOREIGN PATENT DOCUMENTS

| | | |
|---|---|---|
| 56-134364 | 10/1981 | Japan . |
| 62-154273 | 7/1987 | Japan . |
| 4-50676 | 8/1992 | Japan . |

*Primary Examiner*—W. R. Young
*Assistant Examiner*—Thang V. Tran
*Attorney, Agent, or Firm*—Graham & James

[57] ABSTRACT

A position detector detects a relative position of an optical head to a recording medium, and on the basis of the thus-detected relative position, a position detection signal is generated in response to movement of a light beam over a predetermined distance. Then, in response to the position detection signal, a comparison is made between the number of track crossing counted for the predetermined movement distance on the basis of reception of reflection of the light beam, and a predetermined reference value for the predetermined movement distance. Then, track crossing count compensation data is generated which corresponds to a difference between the counted number of track crossing and the reference value, and the counted number of track crossing is corrected by use of such compensation data.

8 Claims, 3 Drawing Sheets

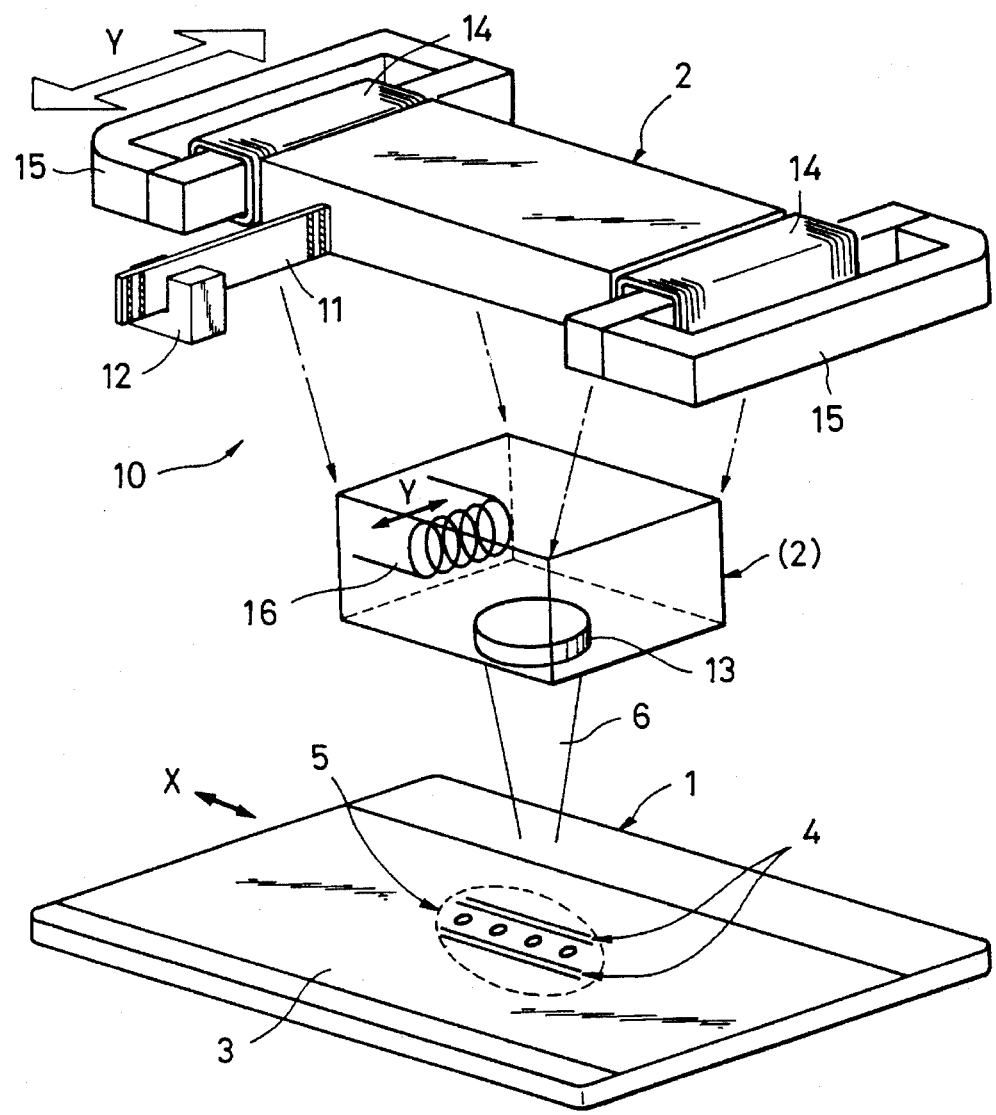
FIG. 1
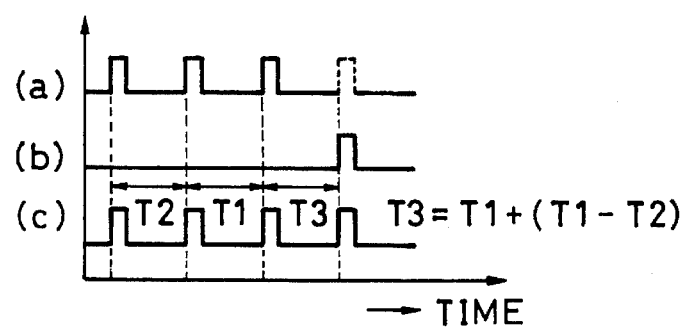
(PRIOR ART)    FIG. 4

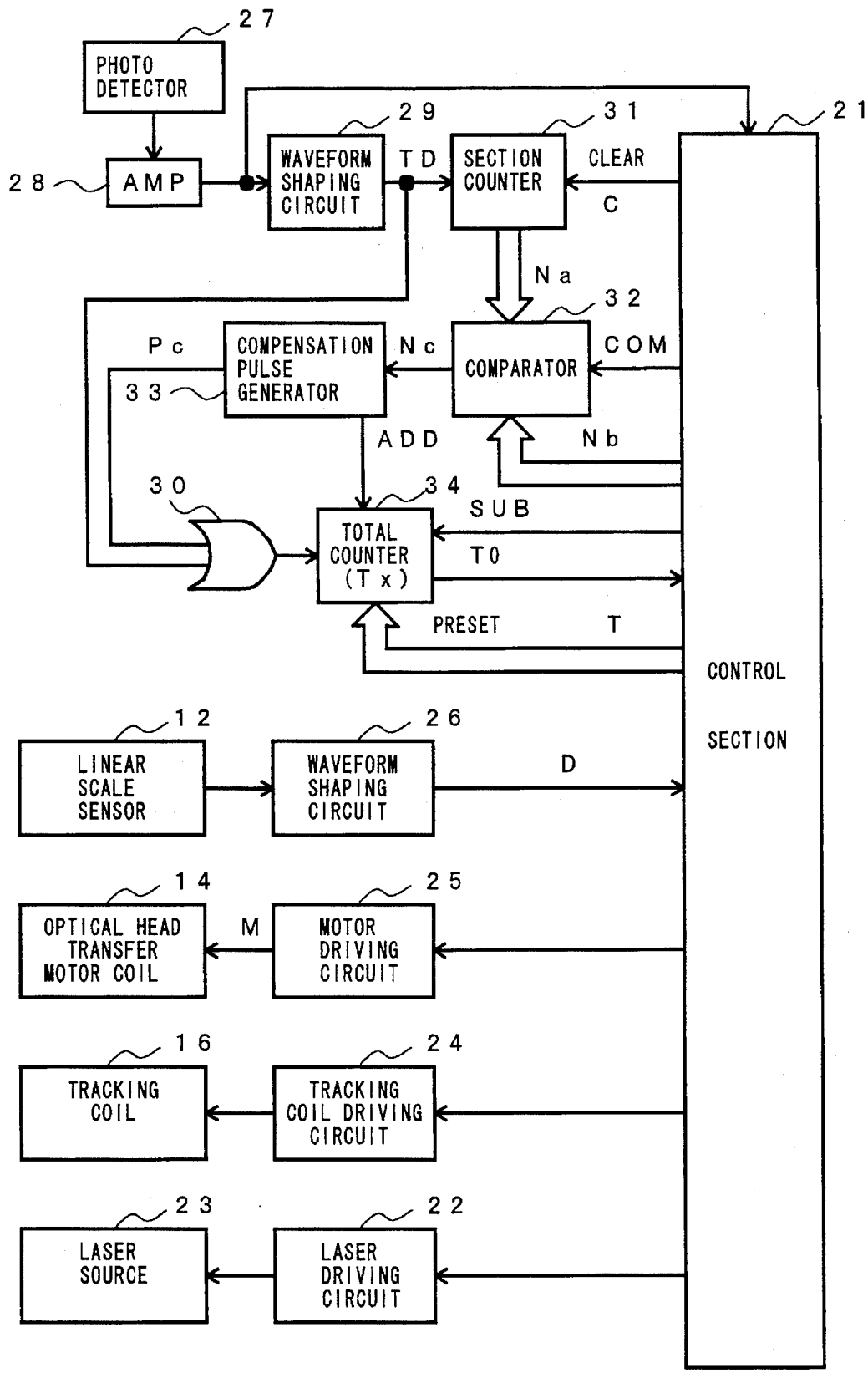
F I G. 2

TRACK SEEK METHOD AND DEVICE FOR USE WITH AN OPTICAL INFORMATION RECORDING AND REPRODUCING APPARATUS

BACKGROUND OF THE INVENTION

The present invention relates generally to an optical information recording and reproducing apparatus, and more particularly to a track seek method and device which are used for successively recognizing every current track position onto which the light beam is irradiated, and for positioning the light beam on a desired target track.

Optical disks and optical cards have conventionally been known as optical information recording media on which high-density recording and reproduction of information are performed by use of light. On the optical information recording media are provided a plurality of optically detectable guide tracks to function as a guide for recording or reproduction of desired information, and data tracks are each provided between every two adjacent guide tracks. Information is recorded in the form of "pits" each having a size of about 1 to 3 μm by irradiation of a minutely converged light beam on the data track. For each of the data tracks is defined a unique track number.

To successively perform information recording or reproduction on such an optical information recording medium by moving the light beam from a current track number (i.e., a track onto which the light beam is currently being irradiated) to a new track number, the light beam must be moved in a direction across the guide tracks and positioned at the new or target track number. Each time the light beam crosses the guide track, reflection of the light beam from the guide track is received to be converted into an electrical signal. This electrical signal is amplified and shaped so as to generate a guide-track-crossing signal representative of the guide track crossing by the light beam. By counting the generated guide-track-crossing signals one by one, it is possible to successively recognize a specific track on which the light beam is being currently located. This can be used as a feedback value to move the light beam to the vicinity of the target track. A series of these operations is collectively called a "track seek" operation or technique. May examples of the prior art track seek technique are known from, for example, Japanese Patent Laid-open Publication Nos. SHO 56-134364 and SHO 62-154273.

If some flaw, scratch or dirt exists in or on the optical information recording medium, however, a light reception or guide-track-crossing signal of appropriate level can not be obtained when the light beam crosses the guide track. This would cause errors in the guide-track-crossing signals, so that the light beam tends to be wrongly positioned a considerable distance away from the target track. A prior art for addressing this problem is disclosed in Japanese Patent Publication NO. HEI 4-50676, for example.

The disclosed prior technique will be outlined with reference to a timing chart of FIG. 4. In item (a) of FIG. 4, solid line indicates actually detected guide-track-crossing signals, while dotted line indicates a missing guide-track-crossing signal that has not been actually detected although it should have been detected. Item (b) of FIG. 4 indicates an imitation signal to be added, and item (c) of FIG. 4 indicates corrected guide-track-crossing signals that are obtained by addition of the signals of items (a) and (b). In the case where no guide-track-crossing signal is not detected within a preset time period after detection of a last guide-track-crossing signal as the light beam is moved at a constant speed or at a given acceleration in a direction across the guide tracks, it is considered that some flaw, scratch or dirt exists in or on the optical information recording medium, and then an imitation signal as indicated in item (b) is generated in place of the missing guide-track-crossing signal. Thus, by counting together the guide-track-crossing signals and the imitation signal as new guide-track-crossing signals as shown in item (c), it is allowed to move the light beam to the vicinity of a desired target track. The above-mentioned preset time period is a period allowing for time differences between adjacent guide-track-crossing signals and is represented as "T3" that equals T1+(T1−T2). This time period is used to deal with scanning speed variations of the light beam to some degree.

However, large-size flaw, scratch or dirt in or on the optical information recording medium may extend over two or more guide tracks, and the above-noted prior technique was often unable to properly deal with the presence of such large-size flaw, scratch or dirt particularly when the light beam was accelerating or decelerating over such places. That is, since the prior technique is based on generating of the imitation signal when the track-crossing signal has failed to be detected within the preset time period, modification of the preset time period in consideration of the last period in the above-mentioned manner is permitted only when only one guide track-crossing signal is missing. Therefore, when plural guide-track-crossing signals have failed to be detected in succession, there is no other way than to successively generate imitation signals while repeating the same time period. But, in such a case where the light beam is accelerating or decelerating, the same preset time period gets out of correspondence to the actual track crossing, and there would be caused an error in the number of imitation signals. Consequently, the number of the guide-track-crossing signals as modified by addition of the imitation signals would greatly differ from the actual number of the guide-track-crossing signals, and therefore the light beam could not be accurately moved to be positioned in the vicinity of a desired target track. In particular, if large-size flaw, scratch or dirt is present in or on the optical information recording medium at time points before and after the light beam is shifted from the acceleration state to the deceleration state, there will be caused an error in the number of added imitation signals, which will present significant problems in the seek track operation.

Further, in order to reduce the time required for the control seek operation, it is desirable that the movement/ scanning of the light beam should be changed to an optimum speed as necessary rather than being at a constant seed or constant acceleration. But, the above-mentioned prior technique lacks reliability due to the previously-stated reasons and hence is not suitable for varying the light beam scanning speed as desired during the control seek operation.

SUMMARY OF THE INVENTION

It is therefore an object of the present invention to provide a track seek method and device which permit successive recognition of every track position on an optical information recording medium where a light beam is currently located to thereby reliably position the light beam in the vicinity of a desired target track, without causing any error even when track-crossing detection signal based on reception of reflection of the light beam becomes inaccurate due to the presence of large-size flaw, scratch or dirt in or on the recording medium, and which also can reduce a time required for a track seek operation by allowing the track seek operation to be performed without any error even when the light beam scanning speed is varied.

In order to achieve the above-mentioned object, the present invention provides a track seek method for use with an optical information recording and reproducing apparatus which scans a light beam relative to an optical information recording medium in a direction across a plurality of tracks formed on the recording medium and counts the number of track crossing by the light beam on the basis of reception of reflection of the light beam from the recording medium so as to determine on which of the tracks the light beam is located. The track seek method comprises a first step for, via a position sensor, detecting a relative position to the information recording medium of an optical head irradiating the light beam, and thereby generating a position detection signal as the optical head moves over a predetermined distance in order to scan the light beam, a second step for, in response to the position detection signal, making a comparison between the number of track crossing counted on the basis of the reception of reflection while the optical head moves over the predetermined distance and a predetermined reference value, and generating track crossing count compensation data corresponding to a difference between the counted number of track crossing and the predetermined reference value, and a third step for correcting the counted number of track crossing by use of the track crossing count compensation data.

The present invention also provides a track seek device for use with an optical information recording and reproducing apparatus. The track seek device comprises an optical head for irradiating an optical beam onto an optical information recording medium provided with a plurality of tracks formed thereon, and receiving reflection of the light beam from the recording medium, a transfer section for moving the optical head relative to the optical information recording medium in a direction across the tracks, a control section for, during a track seek operation, detecting the number of track crossing by the light beam on the basis of reception of the reflection of the light beam by the optical head and controlling the transfer section to position the light beam in the vicinity of a desired target track using the detected number of track crossing as a feedback value, a position detection section for detecting a relative movement amount of the optical head to the information recording medium, and a compensation section for, on the basis of an output from the position detection section, making a comparison between the detected number of track crossing for a specific section where the optical head moves over a predetermined distance and a predetermined reference value for the specific section, so as to generate track crossing count compensation data corresponding to a difference between the detected number and the reference value. The feedback value in the control section is corrected by use of the track crossing count compensation data.

According to the track seek method of the present invention, a relative position of the optical head to the information recording medium is selected by the position detector, and on the basis of such detection, a position detection signal is generated as the optical head moves over a predetermined distance in order to scan the light beam. Then, in response to the position detection signal, a comparison is made between the number of track crossing counted for the predetermined movement distance on the basis of reception of reflection of the light beam, and a predetermined reference value for the predetermined movement distance. Then, track crossing count compensation data is generated which corresponds to a difference between the counted number of track crossing and the reference value, and the counted number of track crossing is corrected by use of such compensation data. Such an arrangement makes it possible to accurately determine on which of the tracks the light beam is located.

Because the actual movement distance of the optical head in scanning the optical beam is detected by means of the position sensor, it is possible to always accurately determine an error in the counted number of track crossing on the basis of the predetermined movement distance. Consequently, even when a track-crossing detection signal based on reception of reflection of the light beam becomes inaccurate due to presence of large-size flaw, scratch or dirt in or on the information recording medium, the present invention can follow the light beam and determine on which of the tracks the light beam is currently located without causing any error, to thereby reliably position the light beam in the vicinity of a desired target track.

Further, since the reference value corresponding to the movement distance is not affected by accelerative or decelerative changes in the light beam scanning speed (i.e., moving speed of the optical head), it is possible to perform an error-free track seek operation in the above-mentioned manner even when the light beam scanning speed is changed as desired, and a time required for a track seek operation can be substantially reduced.

According to the track seek device of the present invention, since the control section detects the number of track crossing by the light beam on the basis of the reception of the reflection of the light beam by the optical head and controls to position the light beam in the vicinity of a desired target track using the detected number of track crossing as a feedback value, and further the feedback value in the control section is corrected by use of the track crossing count compensation data, the same benefits as noted above can be achieved in a similar manner to the above-mentioned.

Now, the preferred embodiment of the present invention will be described in detail below with reference to the accompanying drawings.

BRIEF DESCRIPTION OF THE DRAWINGS

In the accompanying drawings:

FIG. 1 is an exploded perspective view diagrammatically showing an optical card and an optical head drive which are among various component parts of an optical information recording and reproducing apparatus in accordance with an embodiment of the present invention;

FIG. 2 is a block diagram illustrating examples of components associated with a track seek operation performed in the embodiment of FIG. 1;

FIG. 4 is a timing chart showing an example of the prior art track seek control.

DETAILED DESCRIPTION OF THE INVENTION

Figure 3:
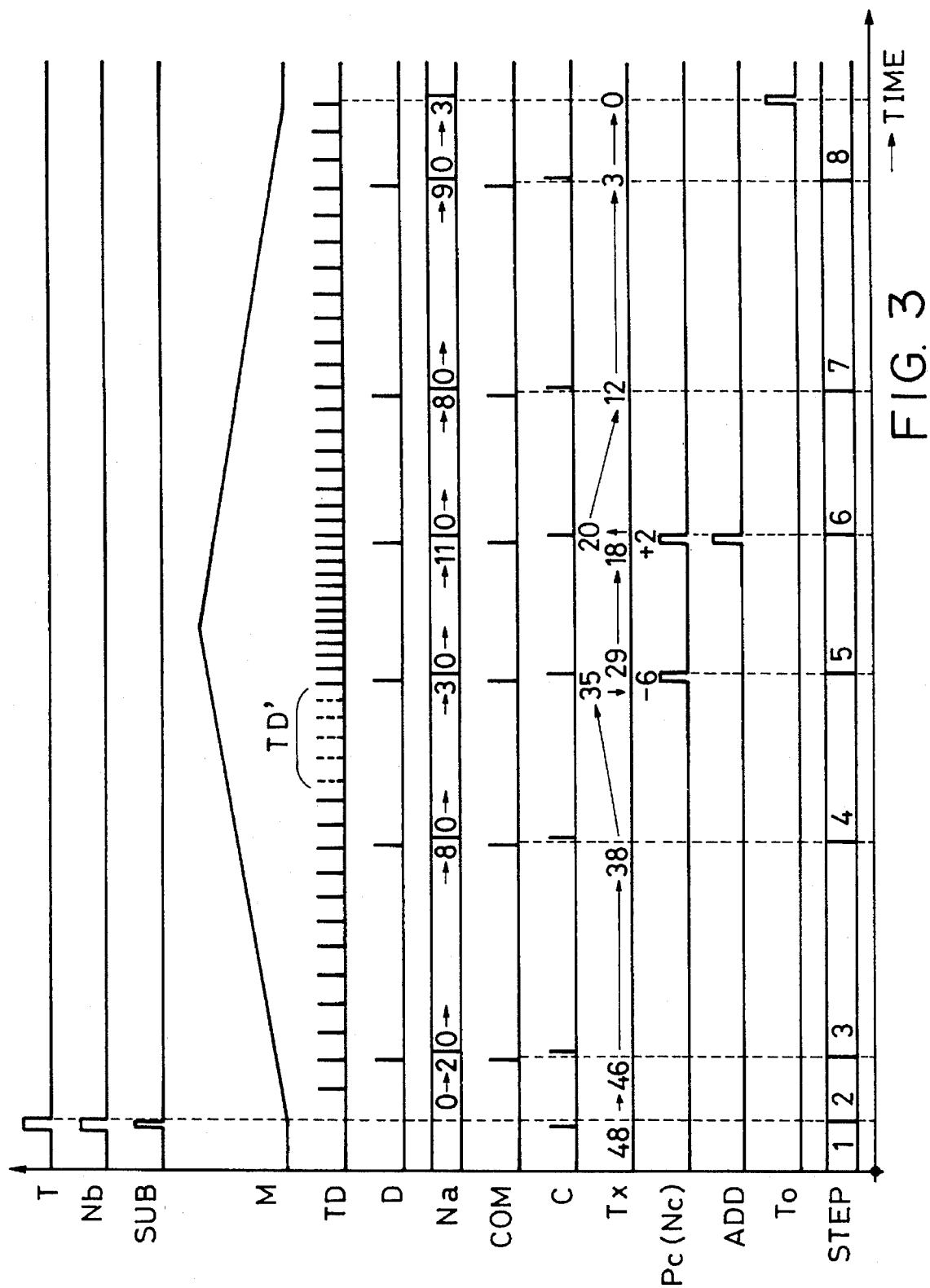
FIG. 3 is a timing chart showing by way of example the track seek control performed by the components of FIG. 2.

In the following description, the principle of the present invention will be explained in relation to an exemplary case where an optical card 1 is used as an optical information recording medium.

FIG. 1 is an exploded perspective view diagrammatically showing an optical card 1 and an optical head drive 10 which are among primary component parts of an optical information recording and reproducing apparatus in accordance with an embodiment of the present invention.

The optical card 1 which may be of the conventional structure is of course portable and removably attachable to the body of the optical information recording and reproducing apparatus. The optical head drive 10 containing an optical read/write head (hereinafter called an optical head) 2 is accommodated within a casing (not shown) of the recording and reproducing apparatus. Upon entry of the optical card 1 into an insertion slot (not shown) formed in the casing, the optical card 1 is automatically transferred in an X direction by means of an unillustrated card transfer mechanism until the card 1 is drawn to a position where a read/write operation is performed on the card 1 by the optical head 2.

The optical card 1 has a substrate made of lightweight hard material such as plastics, and a medium area (information recording area) 3 is formed on a predetermined region of the substrate surface. As shown in FIG. 1 with a portion cut away, the recording medium area has a plurality of guide tracks 4 that extend in the card transfer direction X and are spaced apart from each other at predetermined intervals, and there is formed a data track 5 between every two adjacent guide tracks 4. The guide tracks 4 are formed to be optically detectable. Using a known photoprinting process, for example, each of the data tracks 5 is formed to provide a relatively high reflection factor, while each of the guide tracks 4 is formed to provide a relatively low reflection factor. On the data tracks 5, desired information can be recorded in the form of circular holes commonly known as "pits". As is well known, the pits are formed by irradiation of a properly focused write laser beam, and readout of recorded data on each track 5 is done by detecting that the reflection factor of the laser beam irradiated onto the data track 5 is decreased by the pit portions. The recording medium area 3 is composed of a recording layer made of predetermined material that is reactive to the write laser beam, and a protecting layer that is provided over the recording layer in such a manner to allow transmission therethrough of the read/write laser beam onto the underlying recording layer.

The optical head drive 10 includes an optical head 2, a linear scale 11 secured to a housing of the optical head 2, a linear scale sensor 12 secured to a base frame of the recording and reproducing apparatus, a pair of optical head transfer motor coils 14 secured to the opposite sides of the optical head housing, and a pair of yokes 15 fixed to the base frame of the recording and reproducing apparatus. The optical head transfer motor coils 14 and yokes 15 together form an electric linear motor for transferring the optical head 2 in a Y direction (i.e., in a direction across the tracks 4 and 5 of the optical card 1). In addition, the linear scale 11 and linear scale sensor 12 together form a linear position detector for detecting a movement or travel amount of the optical head 2 in the Y direction.

Although the optical head 2 has been described above as being moved in the Y direction, an alternative arrangement may be such that the optical head 2 is fixed in position and in stead the optical card 1 is moved in the Y direction. In short, it is only necessary that the optical head 2 is movable in the Y direction relative to the optical card 1. In the case where the optical card 1 is moved in the Y direction, the amount of movement in the Y direction of the optical card 1 is of course detected by equivalent means to the linear position detector.

Within the housing of the optical head 2 are integrally provided a laser source 23 for generating laser light (FIG. 2), a light emitting optical system for converging the laser light into a light beam and irradiating a minute spot of the light beam onto the optical card 1 via an objective lens 13, a light receiving optical system for receiving laser reflection from the optical card 1 to direct the laser reflection to a light receiving element (photo detector 27 of FIG. 2), various elements and equipments associated with the above-mentioned components, etc. As is conventionally known, the objective lens 13 is designed to slightly move in the Y direction in response to excitation of a tracking coil 16, so as to finely adjust the spot position of the laser light beam on the optical card 1. It should be obvious that the objective lens 13 and tracking coil 16 are both accommodated within the optical head housing, although they are shown in FIG. 2 as exposed out of the housing.

It is known in the art that the control seek operation involves two types of control, one type based on the far-jump control and the other type based on the near-jump control. The far-jump control is intended for moving the light beam to a desired target track across relatively many tracks and is performed by moving the optical head 2 in the Y direction by means of the optical head transfer motor 14 and 15 (i.e., by scanning the light beam in the Y direction along with the travel of the optical head 2). On the other hand, the near-jump control is for moving the light beam across only one or several tracks and is performed by, in stead of moving the optical head 2, minutely moving the objective lens 13 in the Y direction through excitation of the tracking coil 16 (i.e., by minutely scanning the light beam alone). Normally, when moving the irradiated spot of the laser light beam 6 to a desired target track during the control seek operation, the entire optical head 2 is move to the target track or to the vicinity thereof by the far-jump control, and then the light beam alone is finely positioned at the target track by the near-jump control.

Although not specifically explained herein, the tracking coil 16 is also used in servo-tracking control other than the near-jump control. Here, the servo-tracking control provides chasing-type servo control to allow the light beam to always be finely positioned at a target data track while information read/write operation is performed on the data track.

FIG. 2 is a block diagram illustrating a control system associated with the track seek operation performed in the embodiment. The track seek control system of the present invention will be described below with reference to FIG. 2.

A control section 21 controls the entire system. A signal given from the control section 21 causes a laser driving circuit 22 to output a laser drive signal, in response to which a laser source 23 emits a laser light beam. Another signal given from the control section 21 causes a tracking coil driving circuit 24 to output a tracking coil drive signal, by which the tracking coil 16 is driven. Still another signal given from the control section 21 causes an optical head transfer motor driving circuit 25 to output a motor drive signal, by which the optical head transfer motor coil 14 is driven to move the optical head 2.

The linear scale sensor 12 is an optical sensor in the form of a photo interrupter or the like which outputs a position detection signal in response to an optical scale on the linear scale 11. The position detection signal output from the linear scale sensor 12 is amplified and shaped by a waveform shaping circuit 26, and the output signal of the shaping circuit 26 is supplied to the control section 21 as a linear scale detection signal D. Since the linear scale 11 moves along with the optical head 2, the linear scale detection signal D corresponds to the amount of travel in the Y direction of the optical head 2. For example, the linear scale detection signal D comprises a train of incremental pulses each of which is generated in response to a predetermined amount of travel of the optical head 2. Item D of FIG. 3 illustrates an example of the linear scale detection signal D comprising a train of incremental pulses. Of course, such a sensor for detecting the travel in the Y direction of the optical head 2 may be any other position sensor than the optical linear sensor as mentioned above and may be an absolute sensor rather than the incremental pulse generating sensor.

A photo detector 27 receives laser beam reflection from the optical card 1 and converts the reflection into an electrical signal, which is input to an amplifier 28. The output of the amplifier 28 is provided to a waveform shaping circuit 29, which performs a predetermined waveform shaping process on the output signal of the amplifier 28 in response to the received level of the reflection from a guide track 4. The output signal of the waveform shaping circuit 29 is a guide-track-crossing detection signal TD which, as shown by way of example in item TD of FIG. 3, is a signal forming a pulse each time the optical head 2 crosses a guide track 4. The output signal of the amplifier 28 is also provided to the control section 28 after having been process as necessary for recognition of information pits and for other purposes, but this feature will not be specifically described here because it is already well known in the art.

The guide-track-crossing detection signal TD is provided to an OR gate 30 and to the count input of a section counter 31. The section counter 31 counts the number of guide track crossings detected by the optical head 2. The count value output from the section counter 31 is sent to a comparator 32 as count value data Na. In response to a clear signal C given from the control section 21, the counter 31 is cleared so that the count value data Na is reset to zero.

The other input of the comparator 32 is initially set by a predetermined reference value Nb that is given from the control section 21 at the start of the track seek operation. In response to a comparison instruction signal COM given from the control section 21, the comparator compares the data Na and Nb received at the two inputs in accordance with predetermined comparison conditions. If the count value data Na is within a prescribed range from the reference value Nb, the comparator 32 does not output compensation data Nc; if not, the comparator 32 provides a compensation pulse generator 33 with compensation data Nc having a numerical value corresponding to a difference between the data Na and Nb.

The comparison instruction signal COM is generated for each predetermined travel amount of the optical head 2 on the basis of the linear scale detection signal D. As shown by way of example in item COM of FIG. 3, this comparison instruction signal COM is generated in correspondence to position pulse generation timing of the linear scale detection signal D. The clear signal C for the counter 31 is also generated for each predetermined travel amount on the basis of the linear scale detection signal D. As shown by way of example in item C of FIG. 3, this clear signal C is generated at the start of the track seek operation and thereafter is repetitively generated a little behind the timing of each comparison instruction signal COM. Thus, the count value data Na of the counter 31 obtained when the comparison instruction signal COM is given, indicates the number of guide track crossings detected by the optical head 31 as the optical head 2 moves over a predetermined distance. On the other hand, the reference value Nb given to the comparator 32 indicates the number of the guide tracks which actually exist within the predetermined distance over which the optical head 2 moves. Accordingly, if the count value data Na is within the prescribed range from the reference value data Nb, this means that there has been no track detection error caused by the optical head 2 during travel thereof over the predetermined distance. If, however, the count value data Na is not within the prescribed range from the reference value data Nb, this means that there has been a track detection error (dropped-out or excessive detection) caused by the optical head 2.

Upon receipt of the compensation data Nc, the compensation pulse generator 33 generates a specific number of pulses corresponding to the value of the compensation data Nc, each of which is then supplied to the OR gate 30 as a compensation pulse Pc. At the same time, depending on the value magnitude relation between the data Na and Nb, a signal ADD designating an addition mode is provided from the compensation pulse generator 33 to a total counter 34.

At the start of the track seek control operation, the control section 21 provides the count preset input of the total counter 34 with target count value data T and also gives a subtraction mode designation signal SUB to the total counter 34. The target count value data T provided to the count preset input comprises count value data that is indicative of the number of track guide crossings necessary for the optical head 2 to move from a current track to a target track. Thus, as the initial states at the start of the track seek control operation, the target count value T is preset in the total counter 34, and the count mode of the counter 34 is set to the subtraction mode. To the count input of the total counter 34 is provided the output of the OR gate 30. Thereafter, the total counter 34 subtractively counts the output pulses of the OR gate 30, or additively counts such output pulses only when the addition mode designation signal ADD is given.

When the guide-track-crossing detection signal TD is generated in response to the travel of the optical head 2, the total counter 34 operates in the preset subtraction mode so as to subtractively count pulses of the detection signal TD that are given via the OR gate 30. The total counter 34 is normally in the subtraction mode when the compensation pulses Pc are generated, but the counter 34 is placed in the addition mode in response to the above-mentioned addition mode designation signal ADD, so as to subtractively or additively count the compensation pulses Pc given via the OR gate 30. In other words, in the event that the detected number Na of guide-track-crossings over a measurement section corresponding to a predetermined travel distance is less than the reference value Nb, the subtraction mode is designated so that the counter 34 subtractively counts a specific number of the compensation pulses Pc corresponding to a difference Nc between the two values Na and Nb. This is done to compensate for guide-track-crossing detection signal that has not been successfully generated or dropped out. Conversely, in the event that the detected number Na of guide-track-crossings over a measurement section is greater than the reference value Nb, the addition mode is designated so that the counter 34 additively counts a specific number of the compensation pulses Pc corresponding to the difference Nc. This is done to add and compensate for the number of guide-track-crossing detection that has been excessively subtracted.

Once the count value of the total counter 34 has arrived at zero, the counter 34 generates a zero count arrival detection signal TO which is given to the control section 21. Generation of such a zero count arrival detection signal T0 means that the optical head 2 has reached the target track, so that the control section 21 stops outputting the drive instruction signal to the optical head transfer motor driving circuit 25 so as to deactivate the motor. Once the motor drive signal M has become a value of zero, the travel of the optical head 2 is stopped.

Next, a description will be made by way of example on the comparison conditions in the comparator 32 arranged in the above-mentioned manner.

As previously mentioned, detection signals D are output from the linear scale sensor 12 in response to the movement of the optical head 32, and a guide-track-crossing detection signal TD is obtained for each detection of crossing of the guide track 4 by the optical head 2. When it is detected on the basis of the linear scale detection signals that the optical head 2 has moved over a predetermined distance, a comparison instruction signal COM is given so that count value data Na is compared with the reference value Nb. The reference value Nb is a value that is determined by a correlation between the pitch of the guide tracks of the optical card 1, and the predetermined distance detected on the basis of the linear scale detection signals D (e.g., a single pitch between the graduations of the linear scale 11). Normally, a condition of Na=Nb or Na=Nb−1 exists. However, if some noise occurs, or some scratch, flaw or dirt exists in or on the optical card 1, the count value data Na will not take on the normal value, but Na> Nb or Na<Nb−1 will result.

As the normal comparison condition in the comparator 31, a determination is made as to whether any of the following four expressions of equality and inequality is met or not, and processing based on the determination is performed, in view of the foregoing.

Normal comparison condition expression (1) . . .

$Na=Nb, Na=Nb-1$

Normal comparison condition expression (2) . . .

$Na>Nb, Na<Nb-1$

If the normal comparison condition expression (1), i.e., Na=Nb or Na=Nb−1 is met, then the value Na is determined as being within the prescribed range of the reference value Nb so that compensation data Nc is not generated.

If, on the other hand, the normal comparison condition expression (2), i.e., Na>Nb or Na<Nb−1 is met, then the value Na is determined as not being within the prescribed range of the reference value Nb so that compensation data Nc is generated. In this case, for example, a value of Nc=Nb−Na is generated as the compensation data Nc.

Namely, if Na>Nb, this means that the number of detected track crossings Na is greater than the normal number by a value of Na−Nb, and thus compensation data Nc indicative of the difference Nc=Nb−Na (negative value) is generated. Then, the compensation pulse generator 33 generates an addition mode designation signal ADD in response to the negative sign of the compensation data Nc, as well as a specific number of compensation pulses Pc corresponding to the absolute value of the compensation data Nc. Thus, the total counter 34 makes compensation of additively counting pulses amounting to the value Na−Nb. In other words, the total counter 34 compensates for excessively subtracted pulses.

If Na<Nb−1, this means that the number of detected track crossings Na is smaller than the normal number by a value of Na−Nb, and thus compensation data Nc indicative of the difference Nc=Nb−Na (positive value) is generated. Then, the compensation pulse generator 33 generates a specific number of compensation pulses Pc corresponding to the absolute value of the compensation data Nc. In this case, since the compensation data Nc is in positive sign, no addition mode designation signal ADD is generated. Thus, the total counter 34 makes compensation of subtractively counting pulses amounting to the value Na−Nb. In other words, the total counter 34 makes compensation of subtracting pulses that have not been subtracted.

It should be understood here that if Na=Nb or Na=Nb−1, count compensation by the total counter 34 will not be performed considering that the number of detected track crossings is normal. However, according to this embodiment, before a first linear scale detection signal D is detected after the initiation of travel of the optical head 2, a determination is made as to whether the count value Na of guide-track-crossing detection signals satisfies an initial comparison condition of $0 \leq Na \leq Nb$. If this initial comparison condition is satisfied, then the number of detected track crossings is considered as normal. This is because the embodiment is designed to generate comparison instruction signal COM and clear signal C in correspondence to the incremental pulses of the linear sensor detection signal D, and hence the first generated comparison instruction signal COM does not correspond to the predetermined distance of the optical head travel.

Next, with reference to the timing chart of FIG. 3, a description will be given on an example of the operational sequence in the above-mentioned arrangement.

For convenience of explanation, the reference value Nb is assumed to be "9" in the example of FIG. 3. Namely, it is assumed that if the count value data Na of the section counter 31 is "8" or "9", the number of detected track crossings is considered as normal; whereas if the count value data Na of the section counter 31 is equivalent to or greater than "10", or equivalent to or smaller than "7", the number of detected track crossings is considered as being outside the prescribed range. However, before the first linear scale detection signal D is detected after the start of travel of the optical head 2, the number of detected track crossings is considered as normal as long as the count value Na is within a range from "0" to "9". It is also assumed that the number of guide-track-crossing detection signals necessary for the optical head 2 to move over to a target track, i.e., the target number of track crossings is "48". Item Tx of FIG. 3 indicates varying count values of the total counter 34 and that the initial count value is "48" (T=48).

Further, the example will be described on the assumption that the transfer motor for the optical head 2 is driven on the basis of acceleration/deceleration control. Item M of FIG. 3 shows an example of the motor drive signal M which is indicative of a speed instruction value. The illustrated characteristic shows that acceleration control is performed till arrival at a midpoint between the start of the track seek control operation and the target track, and deceleration control is performed thereafter. Such acceleration/deceleration control is very advantageous in that it can reduce the time required for the track seek operation.

Switching of operational steps "2" to "8" in FIG. 3 is controlled by the pulse timing of the linear scale detection signal D. Switching of these steps and generation of various control signals are all controlled by the control section 21.

STEP 1

Once a track seek start instruction is given, a predetermined initialization process is performed. Namely, data indicative of a target number of track crossings T (= 48) is provided to and preset in the preset input of the total counter 34 and a subtraction mode designation signal SUB is also input to the total counter 34, so that the counter 34 is conditioned to operate in the subtraction mode. In addition, the content of the section counter 31 is reset to zero by a clear signal C, and reference value data Nb (=9) is provided to and set in the comparator 32. Of course, the laser driving circuit 22 is driven by a drive signal from the control section 21 to activate the laser source 23, so that a laser light beam is irradiated onto the optical card 1. Next step 2 is initiated after this initialization process.

STEP 2

Upon initiation of step 2, a motor drive signal M is given to the optical head transfer motor coil 14 via the optical head transfer motor driving circuit 25, so as to start moving the optical head 2 in the Y direction. As previously mentioned, at first, the motor drive signal (speed instruction value) M increases its value to perform acceleration control. As the optical head 2 moves, the laser light beam moves relative to the optical card 1 in a direction across the guide tracks 4. As mentioned earlier, in the normal state, one pulse of track-guide-crossing detection signal TD is output from the waveform shaping circuit 29 each time the laser light beam crosses one guide track 4.

In step 2 of the FIG. 3 example, it is shown that a linear scale detection signal D is obtained upon arrival of two pulses of the track-guide-crossing detection signal TD. Accordingly, in the meantime, the total counter 34 receives the two pulses of the track-guide-crossing detection signal TD via the OR gate 30 to subtractively count the pulses, and thus the count value Tx decrements to "46" (48−2=46). On the other hand, the section counter 31 additively counts the two pulses of the track-guide-crossing detection signal TD, and thus the count value data Na increments to 2.

In response to arrival of the linear scale detection signal D, a comparison instruction signal COM is generated to cause the comparator 32 to compare the two values Na and Nb. In step 2, the above-mentioned initial comparison condition expression is applied because detection is made of the first linear scale detection signal D. Accordingly, the state of Nb=9 and Na=2 in this example is considered as normal, and hence no compensation operation is performed.

STEP 3

After the comparison responsive to the arrival of the linear scale detection signal D, next step 3 is initiated, where a clear signal C is sent to the section counter 31 to make the count value data Na "0". In response to this, the section counter 31 starts counting the guide-track-crossing detection signal TD from "0".

In step 3 of the FIG. 3 example, it is shown that a linear scale detection signal D is obtained upon arrival of eight pulses of the track-guide-crossing detection signal TD. Accordingly, in the meantime, the total counter 34 receives the eight pulses of the track-guide-crossing detection signal TD via the OR gate 30 to subtractively counts the pulses, and thus the count value Tx decrements to "38" (46−8= 38). On the other hand, the section counter 31 additively counts the eight pulses of the track-guide-crossing detection signal TD, and thus the count value data Na increments to 8.

In response to arrival of the linear scale detection signal D, a comparison instruction signal COM is generated to cause the comparator 32 to compare the two values Na and Nb. In step 3, the above-mentioned normal comparison condition expressions are applied. In this case, because Nb=9 and Na=8, the normal comparison condition expression (1) is satisfied. Thus, it is considered that the guide-track-crossing detection has been made normally, and no compensation operation is performed.

STEP 4

After the comparison process responsive to the arrival of the linear scale detection signal D, next step 4 is initiated, where the section counter 31 starts counting the guide-track-crossing detection signals TD again from "0" in a similar manner to the previously noted.

In step 4 of the FIG. 3 example, it is shown that a linear scale detection signal D is obtained upon arrival of three pulses of the track-guide-crossing detection signal TD, i.e., that six pulses TD' (each denoted by dotted line in the figure) which normally should have been detected are missing from the guide-track-crossing detection signal TD. Accordingly, in the meantime, the total counter 34 receives the three pulses of the track-guide-crossing detection signal TD via the OR gate 30 to subtractively count the pulses, and thus the count value Tx decrements to "35" (38−3=35). On the other hand, the section counter 31 additively counts the three pulses of the track-guide-crossing detection signal TD, and thus the count value data Na increments to 3.

In response to arrival of the linear scale detection signal D, a comparison instruction signal COM is generated to cause the comparator 32 to compare the two values Na and Nb. In step 3, the above-mentioned normal comparison condition expressions are applied. In this case, because Nb=9 and Na=3, Na<Nb−1 in the condition the normal comparison condition expression (2) is satisfied. Thus, the number "3" of the guide-track-crossing detection signal TD is considered as abnormal, and a compensation operation is performed in the following manner.

Namely, as compensation data Nc, the comparator 32 sends a value of "6" (Nc=Nb−Na=9−3=6) to the compensation pulse generator 33. The compensation pulse generator 33 generates six compensation pulses Pc upon receipt of the compensation data Nc, but it does not generate an addition mode designation signal ADD. Thus, the total counter 34 further subtractively counts the six pulses so that the count value of Tx decrements to "29" (35−6= 29). Then, a compensation operation is performed to supplement and subtractively count the missing six guide-track-crossing detection pulses.

STEP 5

After the comparison process responsive to the arrival of the linear scale detection signal D, next step 5 is initiated, where the section counter 31 starts counting the guide-track-crossing detection signals TD again from "0" in a similar manner to the previously noted.

In the example of FIG. 3, during the course of step 5, the optical head 2 almost reaches a midpoint of its target travel distance, and the motor drive signal M is switched to a deceleration mode.

In step 5 of the FIG. 3 example, it is shown that a linear scale detection signal D is obtained upon arrival of eleven pulses of the track-guide-crossing detection signal TD. Accordingly, in the meantime, the total counter 34 subtractively counts the eleven pulses, and thus the count value Tx decrements to "18" (29−11=18). On the other hand, the section counter 31 additively counts the eleven pulses of the track-guide-crossing detection signal TD, and thus the count value data Na increments to 11. In this case, because Nb=9 and Na=11, Na>Nb in the condition the normal comparison condition expression (2) is satisfied in the comparator 32. Thus, the number "11" of the guide-track-crossing detection signal TD is considered as abnormal, and a compensation operation is performed in the following manner.

Namely, as compensation data Nc, the comparator 32 sends a value of "−2" (Nc=Nb−Na=9−11=−2) to the compensation pulse generator 33. The compensation pulse generator 33 generates two compensation pulses Pc upon receipt of the compensation data Nc, and it also generates an addition mode designation signal ADD because the compensation data Nc is in negative sign. Thus, the total counter 34 additively counts the two pulses so that the count value of Tx increments to "20" (18+2=20). In this way, this step has caused the total counter 34 to subtract a total value of "9" after the additive and subtractive counting operations. The addition mode designation signal ADD is cancelled immediately so that the total counter 34 is brought back to the subtraction mode designation state.

STEP 6

After the comparison process responsive to the arrival of the linear scale detection signal D, next step 6 is initiated, where the section counter 31 starts counting the guide-track-crossing detection signals TD again from "0" in a similar manner to the previously noted.

In step 6 of the FIG. 3 example, it is shown that a linear scale detection signal D is obtained upon arrival of eight pulses of the track-guide-crossing detection signal TD. Accordingly, the same control operation for the normal detection is performed as in the above-mentioned step 3, and consequently the count value Tx of the total counter 34 decrements to "12" (20−8=12).

STEP 7

After the comparison process responsive to the arrival of the linear scale detection signal D, the operation step is switched to step 7, where the section counter 31 starts counting the guide-track-crossing detection signals TD again from "0" in a similar manner to the above-mentioned.

In step 7 of the FIG. 3 example, it is shown that a linear scale detection signal D is obtained upon arrival of night pulses of the track-guide-crossing detection signal TD. Accordingly, the same control operation for the normal detection is performed as in the above-mentioned step 3, and consequently the count value Tx of the total counter 34 decrements to "3" (12−9=3).

STEP 8

After the comparison process responsive to the arrival of the linear scale detection signal D, the operation step is switched to step 8, where the section counter 31 starts counting the guide-track-crossing detection signals TD again from "0" in a similar manner to the previously noted.

In this step 8, upon arrival of three pulses of the track-guide-crossing detection signal TD, the count value Tx of the total counter 34 decrements to "0" (3−3=0) and thus a zero count arrival detection signal T0 is output. In response to the zero count arrival detection signal T0, the control section 21 stops outputting the drive instruction signal M to the optical head transfer motor driving circuit 25 so as to deactivate the motor. Once the drive instruction signal M has become a value of "0", the optical head 2 is caused to stop travelling so as to be positioned in the vicinity of the target track.

The foregoing is the track seek operation based on the far-jump control which positions the optical head 2 in the vicinity of a target track. After termination of such a track seek operation based on the far-jump control, the light beam is finely positioned at the target track. More specifically, the track number of a track on which the light beam is currently located is determined, and if the determination shows that the light beam is not exactly located on the target track, then the tracking coil 16 is driven to move the objective lens 13 in stead of moving the optical head 2, in such a manner that the light beam is finely moved in the direction across the guide tracks 4 until the light beam is precisely positioned on the target track.

According to the above-described embodiment, not only the reference value Nb but also the value Nb−1 which is smaller than Nb by one are employed as the prescribed range values for prescribing the number of track crossings within a section corresponding to the predetermined travel distance of the optical head 2. This can prevent overrunning of the optical head 2 when the target track is located at the end of the information recording area (medium area 3) on the optical card 1. In other words, the light beam irradiated from the optical head 2 can be precisely positioned on the target track or immediately before the target track without missing the information recording area.

Namely, according to the embodiment as described above, a given extended range (between Nb and Nb−1 in the illustrated example) is set as the reference value, and no compensation is made if a detected value is within the range. With such an arrangement, the embodiment can properly cope with variations in the normal number of track crossings within one compensation section which may occur if the multiple of the guide track interval does not necessarily coincide with the length of one compensation section determined by the position detection signal. Stated differently, the embodiment is designed to properly cope with variations in the number of track crossings between Nb and Nb−1 which may occur even when detection and counting of the track crossings are being performed normally. In the event that the count value Na of the track crossings falls outside the thus-extended reference value range, the arithmetic operation for obtaining the compensation data Nc calculates a difference between the reference value and the count value Na on the basis of the upper limit Nb of the value range, and hence relatively extensive compensation is made. Namely, compensation of "Nc=Nb−Na=, i.e., compensation for one too many pulse is performed although in reality it is only sufficient to perform compensation that uses "Nc=(Nb−1)−Na" as the compensation data Nc. This arrangement may cause the light beam to stop a little before the target track, but it can reliably prevent the light beam from overrunning to stop past the target track. Consequently, in the case where the target track is located at the end of the information recording area (medium are 3), the light beam is prevented from stopping past the target track and can be stopped exactly on the target track position or in the vicinity thereof, and overrunning of the optical head 2 can effectively be avoided. As the result, the embodiment can eliminate such possibility of the light beam overrunning beyond the information recording area (medium area 3) to disable the track seek operation.

Although the embodiment has been described above as performing the track seek operation by moving the optical head 2, the optical card 1 rather than the optical head 2 may be moved, or alternatively both of the optical head 2 and the optical card 1 may be moved relatively to each other.

Further, although, in the above-described embodiment, the compensation pulse Pc is provided to the total counter 34 via the OR gate 30 for compensation operation, the detailed algorithm for compensation operation should not be understood as restricted to this approach alone. For example, the count value of the section counter 31 may be subtracted from the count value of the total counter 34, and in such a case, a value obtained from adding (or subtracting) the compensation data Nc to (or from) the count value data Na of the section counter 31 may be subtracted from the count value of the total counter 34.

Furthermore, although the above-described embodiment performs such control that the number of guide track crossings T to a target track is initially input to the total counter 34 and then the optical head 2 is moved until the count value Tx of the total counter 34 reaches "0" through the subtractive counting operation, any other control method may of course be employed. For example, preferred alternative control may be such that the total counter 34 is initially set to zero and caused to perform additive counting operation in response to the guide-track-crossing detection signal TD and compensation data Nc (or subtractive counting operation depending on the value of the compensation data Nc), and the optical head 2 is moved until the count value of the total counter 34 coincides with the number of guide track crossings T to the target track.

Moreover, although, in the above-described embodiment, the optical head travel distance corresponding to one compensation section is set to correspond to generation intervals of the incremental pulses in the linear scale sensor 12 and is constant for every section, it may be varied as necessary. In such a case, the reference value Nb may of course be varied depending on the travel distance for every section. Further, although, in the embodiment, the comparison instruction signal COM for determining one compensation section is generated in correspondence to one incremental pulse generated from the linear scale sensor 12, the signal COM may alternatively be generated in correspondence to a plurality of the incremental pulses. Moreover, in the case where an absolute-type position sensor is employed as a position detection means, arithmetic operations may of course be performed to detect that an absolute position detection signal indicative of a travel amount of the optical head has changed by an amount corresponding to one compensation section, so as to generate the comparison instruction signal COM on the basis of the detection.

Moreover, although the structure of the embodiment as shown in FIGS. 2 and 3 has been described above using discrete circuit means, it should be obvious that a microprocessor may replace some of the circuit means to achieve the same functions.

Furthermore, although the embodiment has been described above as using an optical card 1 as an information recording medium, the present invention may also be applied to any other information recording medium such as an optical information recording disk.

As apparent from the foregoing, when there exists deficiency or error in detection/counting of the number of track crossings due to flaw, scratch or dirt in or on the information recording medium, the present invention compensates for such error each time the optical head travels over a predetermined distance in response to a detection signal from a position sensor and thereby can achieve a stable and rapid track seek operation by a light beam. Further, even when there are variations in the relative speed between the light beam and the recording medium, the present invention can reliably perform the track seek operation without being affected by the variations and hence can substantially reduce a time required for the track seek operation by providing optimum acceleration/deceleration control of the scanning speed of the light beam, i.e., the traveling speed of an optical head.

What is claimed is:

1. A track seek method for use with an optical information recording and reproducing apparatus which scans a light beam relative to an optical information recording medium in a direction across a plurality of tracks formed on the recording medium and counts the number of track crossing by the light beam on the basis of reception of reflection of the light beam from the recording medium so as to determine on which of the tracks the light beam is located, said track seek method comprising the steps of:

a first step for, via a position sensor, detecting a relative position to the information recording medium of an optical head irradiating the light beam, and thereby generating a position detection signal as the optical head moves over a predetermined distance in order to scan the light beam;

a second step for, in response to the position detection signal, making a comparison between the number of track crossing counted on the basis of the reception of reflection while the optical head moves over the predetermined distance and a predetermined reference value, and generating track crossing count compensation data corresponding to a difference between said counted number of track crossing and said predetermined reference value; and a third step for correcting said counted number of track crossing by use of said track crossing count compensation data.

2. A track seek method for use with an optical information recording and reproducing apparatus as defined in claim 1 wherein said reference value has a predetermined range, and when said counted number of track crossing is outside said range of the reference value, said second step generates track crossing count compensation data corresponding to a difference between said counted number of track crossing and said range of the reference value.

3. A track seek method for use with an optical information recording and reproducing apparatus as defined in claim 2 wherein said second step generates said track crossing count compensation data by performing an arithmetic operation between an upper limit value of said range of the reference value and said counted number of track crossing.

4. A track seek method for use with an optical information recording and reproducing apparatus as defined in claim 1 wherein said third step generates a specific number of compensation pulse corresponding to said track crossing count compensation data and then adds or subtracts the compensation pulse to or from said counted number of track crossing in order to correct said counted number.

5. A track seek method for use with an optical information recording and reproducing apparatus as defined in claim 1 wherein said first step generates said position detection signal each time said optical head moves over the predetermined distance, and said third step is responsive to said position detection signal for correcting said counted number of track crossing each time said optical head moves over the predetermined distance.

6. A track seek method for use with an optical information recording and reproducing apparatus as defined in claim 1 wherein said optical information recording medium is provided with a plurality of guide tracks and a data track formed between said guide tracks for recording information thereon, and wherein the number of track crossing is counted by detecting the light beam crossing each of the guide tracks.

7. A track seek method for use with an optical information recording and reproducing apparatus as defined in claim 1 wherein said optical information recording medium is an optical card.

8. A track seek device for use with an optical information recording and reproducing apparatus, comprising:

an optical head for irradiating an optical beam onto an optical information recording medium provided with a plurality of tracks formed thereon, and receiving reflection of the light beam from the recording medium;

transfer means for moving said optical head relative to the optical information recording medium in a direction across said tracks;

control means for, during a track seek operation, detecting the number of track crossing by the light beam on the basis of reception of the reflection of the light beam by said optical head and controlling said transfer means to position the light beam in the vicinity of a desired target track using the detected number of track crossing as a feedback value;

position detection means for detecting a relative movement amount of said optical head to said information recording medium; and compensation means for, on the basis of an output from said position detection means, making a comparison between the detected number of track crossing for a specific section where said optical head moves over a predetermined distance and a predetermined reference value for the specific section, so as to generate track crossing count compensation data corresponding to a difference between said detected number and said reference value, wherein said feedback value in said control section is corrected by use of said track crossing count compensation data.

* * * * *